Dec. 29, 1953 A. BUNBLASKY 2,664,537
THYRATRON INVERTER CIRCUIT
Filed Feb. 21, 1950
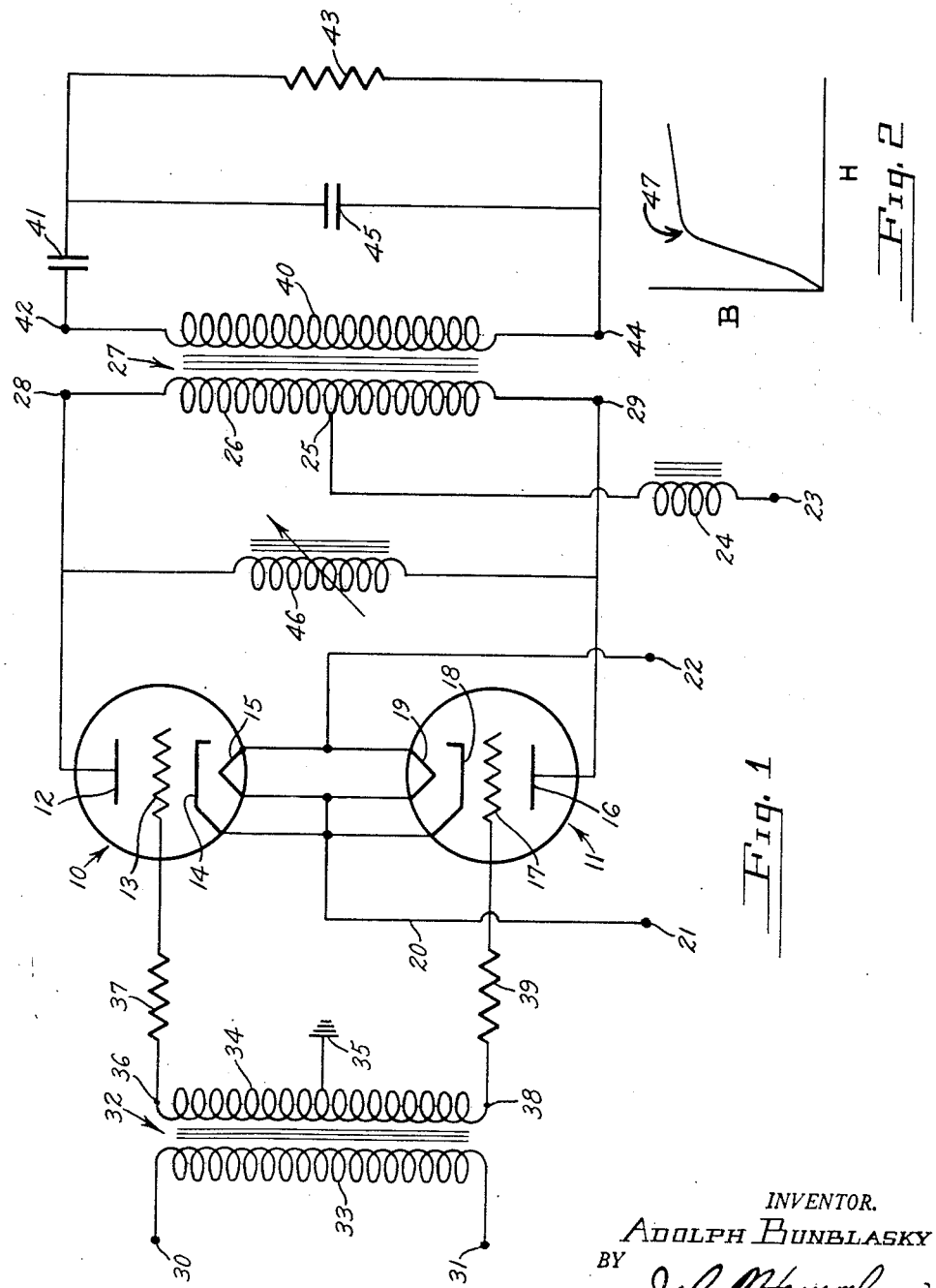
INVENTOR.
ADOLPH BUNBLASKY
BY
John J. Hanrahan
ATTORNEY Patented Dec. 29, 1953

2,664,537

UNITED STATES PATENT OFFICE 2,664,537

THYRATRON INVERTER CIRCUIT

Adolph Bunblasky, New Canaan, Conn., assignor to Sorensen & Company, Inc., Stamford, Conn., a corporation of Connecticut Application February 21, 1950, Serial No. 145,371

2 Claims. (Cl. 321—18)

The present invention relates to electronic inverters adapted to convert a direct current supply into an alternating current supply and it relates more particularly to a thyratron inverter generator having improved regulation and a relatively low internal impedance.

Thyratron inverter generator circuits are often used when it is desired to convert a direct current source into an alternating current. Various types of inverter generator circuits have been employed, some using self triggering circuits wherein the values of the components determine the frequency of the alternating current output.

Still other inverter generator circuits employ a driving or synchronizing voltage applied to the control grids of the thyratron tubes to predetermine the frequency of the output. This synchronizing voltage may be derived from a highly stable vacuum tube oscillator or from an electro-mechanical oscillator employing a tuning fork or the like.

It is highly advantageous to have inverter circuits generate an alternating current voltage with a good degree of regulation. That is, it is desirable that the output voltage remain substantially constant with an increase in load current or with a change in the voltage of the direct current supply. It is recognized that in many applications a slight decrease in voltage at full load may be tolerated. However, marked decreases in output voltage with an increase in load current or a change in the applied direct current potential is usually undesirable.

If we consider the regulation of an inverter generator, it becomes evident that the regulation and the internal impedance are dependent upon one another. This may be readily understood from the following illustrative example.

Assume an inverter type generator is supplying a load of 10 amperes to a simple resistive load and further assume that the E. M. F. of the generator is 100 volts, said generator having an internal impedance Z. Now the output voltage will be determined by the equation $E_o = 100 - 10Z$. Let us first consider the instance where we have fair regulation and the output voltage is 90 volts. Then by substituting in the above equation it is seen that the internal impedance Z is equal to 1 ohm.

Next consider the regulation to be poorer, i. e., for the same 10 ampere load assume the output voltage is now only 80 volts. Then by substituting the 80 volts in the above equation we find that the internal impedance Z is now equal to 2 ohms. Thus, the poorer the regulation, for a given load, the higher is the internal impedance of the generator. The conversion is likewise true in that by lowering the internal impedance of the inverter generator the regulation is improved. This follows for with a lower internal impedance the voltage drop due to this impedance is likewise lower and hence better voltage regulation is achieved.

Prior inverter generator circuits have been subject to rather poor regulation and hence high internal impedances in that the magnitude of the output voltage is highly sensitive to changes in the voltage of the direct current input and to changes in the value of the load current.

In view of the foregoing, it is an object of my invention to provide an inverter generator circuit having a low internal impedance.

Another object of my invention is to provide an inverter generator circuit having improved regulation whereby variations in the direct current input or in the value of the load do not manifest themselves by substantial variations in the output alternating current voltage.

Yet another object of my invention is to achieve the above objects by employing an iron-cored inductance across the output circuit of the inverter generator where the characteristic of said inductance is such that when the voltage across it exceeds a predetermined value its permeability decreases rapidly.

The above and other objects will become more apparent from the following detailed description when taken in connection with the accompanying drawing which shows one embodiment of the invention. It is to be understood, however, that other variations may be embodied without departing from the spirit of the invention and the scope of the appended claims.

In the drawing:

Fig. 1 is a schematic circuit diagram of one embodiment of the invention; and

Fig. 2 is a view showing a magnetization curve wherein the abscissa H represents an alternating current magnetizing force and the ordinate B represents the density of the alternating current flux.

Referring now to the drawing, the inverter comprises two thyratron tubes 10 and 11, thyratron 10 having a plate element 12, a grid 13, a cathode 14 and a filament 15. Thyratron 11 is similar to thyratron 10 and has a plate element 16, a grid 17, a cathode 18 and a filament 19.

Filaments 15 and 19 are connected in parallel and one terminal of the parallel connection is electrically connected to cathodes 14 and 18 which are then brought by a connection 20 to a negative terminal 21 of a suitable source of potential. A terminal 22 which is positive with respect to terminal 21 is connected to the other side of parallel connected filaments 15 and 19. Thus, the potential appearing across the terminals 21 and 22 is impressed across each of the filaments of the thyratrons.

Plate potential for the thyratrons 10 and 11 is supplied through a terminal 23 which is substantially more positive with respect to terminal 21 than is terminal 22. Positive terminal 23 is connected through an inductance 24 to a center-tap 25 of primary winding 26 of a transformer 27.

An end terminal 28 of primary winding 26 is connected to the plate element 12 of thyratron 10, the other terminal 29 being connected to plate element 16 of thyratron 11. Thus, the potential appearing across the terminals 21 and 23 is that impressed across the cathode and plate elements of each of the thyratrons.

The driving voltage, or synchronizing voltage as it may also be called, consists of an alternating current voltage of precise frequency and low power and is impressed across the input terminals 30 and 31 of an input transformer 32 which has a primary winding 33 and a secondary winding 34. This synchronizing voltage may be generated by any suitable means such as a highly stable electronic oscillator or multivibrator, or it may be generated by a well-known electro-mechanical means having a tuning fork as its essential component.

The secondary winding 34 has a center tap 35 which is connected to ground. If desired, it may also be connected to previously mentioned terminal 21. End terminal 36 of secondary winding 34 is connected through a resistance 37 to grid 13 of thyratron 10. The other end terminal 38 is likewise connected through a resistance 39 to grid 17 of thyratron 11.

The output circuit of the inverter includes the secondary winding 40 of the transformer 27. A capacitor 41 is connected to one terminal 42 of the secondary winding 40, the other side of the capacitor being connected through a load 43 to the other terminal 44 of the winding 40. A commutating capacitor 45 is connected directly across the load 43.

The terminals 36 and 38 are always of opposite polarity and therefore the grids 13 and 17 are likewise of alternating and opposite polarity. The positive cycles cause the grids to gain control and cause the thyratrons to alternately fire thereby causing a charging and discharging of the commutating capacitor 45 in the output circuit. The alternate charging and discharging of the commutating capacitor 45 results in an alternating current output voltage. The capacitor 41 serves to improve the waveform particularly when the load 43 is resistive.

A saturable core reactor 46 comprising an iron-cored variable inductance also forms a part of the output circuit. In the embodiment shown, this reactor is connected across the primary winding 26 of transformer 27, and across the plate elements 12 and 16 of the thyratrons 10 and 11. The saturable reactor 46 has the important function of improving the regulation of the inverter, that is, the amplitude of the alternating current output is made less susceptible to changes in the direct current input applied across the terminals 21 and 23 and to changes in the load current through load resistance.

The function of the saturable core reactor 46 may be readily understood when consideration is taken of its magnetization curve or B vs. H curve as it is commonly called. Such curves are, of course, well known wherein the ordinate "B" is the flux density, the abscissa "H" is the magnetizing force, and the slope of the curve is called the permeability or mu. Now, such a curve has a "knee" or saturation point which means that after the magnetizing force H has reached a certain point, the curve begins to flatten out very quickly and further increases in the magnetizing force H result in only slight increases in the flux density B.

The sharpness of this "knee" or bend in the curve is dependent upon the particular iron used for the core of the saturable core reactor. In fact, by suitable choice of iron alloys a wide degree of variations may be obtained in the resulting magnetization curve.

Magnetization curves may be plotted for either direct current or alternating current magnetizing forces. In the case of the direct current curve, the magnetizing force is usually referred to as the number of ampere-turns per inch and the flux density is defined as the number of lines per square inch. In the instance of the alternating current magnetization curve, which is generally similar in shape to the direct current magnetization curve, the magnetizing force H is usually shown as being the root-mean-square (R. M. S.) ampere-turns per inch and the flux as the maximum "B max" alternating flux density per square inch.

In the present invention, use is made of the characteristics of the alternating current magnetization curve and a sketch of a typical curve is shown in Fig. 2. Furthermore, in view of the wide range of characteristics available, simply due to the choice of iron alloy used in the core of a reactor, it becomes evident that the reactor 46 may be designed so that the normal voltage across it is just below the saturation region 47 as indicated in Fig. 2. Under such conditions, the inverter would operate normally providing an alternating current output across the load 43. The output impedance would be normally low as the governing factor is the relatively low impedance of the saturable core reactor across the output circuit.

Assume now that the direct current voltage input across the terminals 21 and 23 tends to increase, then the alternating current magnetizing voltage across the saturable core reactor 46 increases and the saturation point 47 of Fig. 2 is passed. This means that the permeability mu decreases sharply with a concomitant lowering of the impedance of the reactor 46 and an increase in the current flowing through it.

It then becomes evident that a slight change in the output alternating current voltage which appears across the reactor 46 results in a marked non-linear increase in the current through the reactor. For example, a 10 per cent increase in the voltage across the reactor results in a much greater than 10 per cent increase in the current which effectively reduces the impedance of the reactor 46. The impedance of the reactor 47 is particularly sensitive to changes in the voltage when the normal point of operation is in the region of the "knee" 47 of the magnetization curve.

An increase in the input direct current voltage at terminals 21 and 23 tends to increase the alternating current output and results in a decrease in the permeability of the inductance thereby allowing more alternating current to flow through the saturable reactor. Should the input voltage at terminals 21 and 23 decrease however, the permeability would increase with a corresponding increase in the impedance of the saturable reactor. This results in a decrease in the alternating current flowing through the saturable core reactor thereby preventing a substantial decrease in the value of the alternating current voltage appearing across the load 43.

It is thus seen that an increase or decrease in the impedance has a greater effect on the alternating current flowing through the reactor than it does on the current flowing through the primary winding 26 of transformer 27. As the impedance of the winding is substantially constant for a particular frequency, it is evident that the voltage developed thereacross is substantially independent of slight changes in the direct current input.

With the arrangement described above the regulation is also improved with regards to changes in the current through the load 43. In the usual type inverter circuit not having the saturable reactor 46 operating as described, an increase in the current through the load 43 would result in a decrease in the output voltage.

With the present invention, however, an increase in the load current would not cause a substantial decrease in the output voltage for as it tended to decrease the impedance of the reactor 46 would immediately increase causing less current to flow through it in order to maintain a substantially constant current through the transformer 27. The voltage across the load is thereby maintained at substantially the same value it was prior to the increase in the load current.

By making inductance 46 variable, the circuit may be initially adjusted to give various degrees of regulation.

Having thus described the invention, what I claim is:

1. An inverter circuit for converting a direct current supply into an alternating current comprising; a plurality of gas-filled discharge devices, each of which contains a plate element, a cathode, and a grid electrode; an output transformer having a primary winding connected between the plate elements of the discharge devices; a manually adjustable magnetic-cored inductance connected across the primary winding of the output transformer; and means for applying a controlling alternating current voltage to the grid electrodes to cause the discharge devices to alternately conduct and thereby provide an alternating current output across the primary winding and the inductance; the circuit characteristics of the primary winding, the discharge devices, and the adjustable inductance adjusted to provide a flux-density in the core of the inductance to operate in the region of magnetic saturation.

2. An inverter circuit for converting a direct current supply into an alternating current comprising; a plurality of gas-filled discharge devices, each of which contains a plate element, a cathode, and a grid electrode; an output transformer having a primary winding connected between the plate elements of the discharge devices and a secondary winding for connecting to a load; circuit means for lowering the internal impedance of said inverter, said means including a manually adjustable magnetic-cord inductance connected across the primary winding of the output transformer; and means for applying a controlling alternating current voltage to the grid electrodes to cause the discharge devices to alternately conduct and thereby provide an alternating current output across the primary winding and the inductance; the circuit characteristics of the primary winding, the discharge devices and the adjustable inductance adjusted to provide a flux-density in the core of the inductance to operate in the region of magnetic saturation.

ADOLPH BUNBLASKY.

References Cited in the file of this patent

UNITED STATES PATENTS

| Number | Name | Date |
|---|---|---|
| Re. 17,693 | Chubb | June 3, 1930 |
| 1,581,948 | Hobart | Apr. 20, 1926 |
| 1,929,724 | Willis et al. | Oct. 10, 1933 |
| 2,009,788 | Sabbah | July 30, 1935 |
| 2,009,833 | Bedford | July 30, 1935 |
| 2,085,061 | Aggers | June 29, 1937 |
| 2,144,289 | Hanley | Jan. 17, 1939 |
| 2,575,600 | Smith | Nov. 20, 1951 |